United States Patent
Kim et al.

(10) Patent No.: US 8,427,742 B2
(45) Date of Patent: Apr. 23, 2013

(54) LAMINATE HAVING PHOTOCHROMIC FUNCTION AND INFRARED SHIELD FUNCTION

(75) Inventors: Woo-Sung Kim, Daejeon (KR); Young-Jun Hong, Daejeon (KR); Hak-Shin Kim, Daejeon (KR); Hyeon Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/104,166

(22) Filed: May 10, 2011

(65) Prior Publication Data

US 2011/0211251 A1 Sep. 1, 2011

Related U.S. Application Data

(63) Continuation of application No. PCT/KR2009/006730, filed on Nov. 16, 2009.

(30) Foreign Application Priority Data

Nov. 14, 2008 (KR) .................. 10-2008-0113622

(51) Int. Cl.
*F21V 9/04* (2006.01)
(52) U.S. Cl.
USPC .......................................................... 359/359
(58) Field of Classification Search .................. None
See application file for complete search history.

(56) References Cited

U.S. PATENT DOCUMENTS

| | | | |
|---|---|---|---|
| 3,269,267 A * | 8/1966 | Collins | 351/44 |
| 6,055,088 A | 4/2000 | Fix et al. | |
| 2005/0136260 A1 * | 6/2005 | Garcia | 428/411.1 |
| 2006/0229406 A1 * | 10/2006 | Silverman et al. | 524/501 |
| 2010/0118376 A1 | 5/2010 | Kwon et al. | |

FOREIGN PATENT DOCUMENTS

| | | |
|---|---|---|
| CN | 1922512 | 2/2007 |
| JP | 62-065957 | 3/1987 |
| JP | 01-138541 | 5/1989 |
| JP | 03-141137 | 6/1991 |
| JP | 10-114007 | 5/1998 |
| KR | 20-0287060 Y1 | 8/2002 |
| KR | 10-0631344 B1 | 10/2006 |
| KR | 20-2007-0000216 U | 2/2007 |
| KR | 10-2008-0025627 A | 3/2008 |
| KR | 10-2008-0091734 A | 10/2008 |

* cited by examiner

*Primary Examiner* — Derek S Chapel
(74) *Attorney, Agent, or Firm* — McKenna Long & Aldridge, LLP

(57) ABSTRACT

The present invention relates to a laminate that includes a pair of substrates; and one or more photochromic films and one or more infrared (IR) shield films that are provided between the pair of substrates, wherein the photochromic films or the infrared (IR) shield films that are in contact with a pair of substrates are adhered to the substrates by an adhesion film. The laminate according to the present invention has a high durable photochromic function having a UV shielding effect and an infrared (IR) shielding effect.

13 Claims, 6 Drawing Sheets

— GENERAL ADHESION GLASS
---- PHOTOCHROMIC ADHESION GLASS
--- GLASS LAMINATE INCLUDING PHOTOCHROMIC FILM AND IR SHIELDING FILM
······· GLASS LAMINATE INCLUDING PHOTOCHROMIC FILM AND IR SHIELDING COATING

LAMINATE HAVING PHOTOCHROMIC FUNCTION AND INFRARED SHIELD FUNCTION

This application is a continuation application of PCT/KR2009/006730, filed on Nov. 16, 2009, which claims priority from Korean Patent Application No. 10-2008-0113622, filed on Nov. 14, 2008 in the KIPO. The disclosures of PCT/KR2009/006730 and KR 10-2008-0113622 are incorporated herein by reference in their entirety.

DISCLOSURE

1. Technical Field

The present invention relates to a laminate that has a photochromic function infrared (IR) shield function and high durability.

2. Background Art

A general glass allows sunlight to pass therethrough, such that a room temperature of a vehicle or a house is rapidly increased. In the case of vehicles, the glass prevents a driver and a passenger from having a clear visual field because of a direct ray of light.

In order to prevent the above problem, a method for applying a photochromic material to the glass for vehicle in a film form has been proposed.

However, until now, a technology for a laminate that has a high durability as well as a photochromic function shielding UV and visible rays and an infrared (IR) shield function shielding infrared (IR) has not yet been developed.

Disclosure

Technical Problem

It is an object of the present invention to provide a laminate that has a photochromic function shielding UV and visible rays, an infrared (IR) shield function shielding IR, and high durability.

Technical Solution

The present invention provides a laminate that includes a pair of substrates; and one or more photochromic films and one or more infrared (IR) shield films that are provided between the pair of substrates, wherein the photochromic films or the infrared (IR) shield films that are in contact with a pair of substrates are adhered to the substrates by an adhesion film.

Advantageous Effects

According to the present invention, there is provided a glass laminate that is capable of improving shielding of UV, visible rays, and IR, efficiently lowering discoloring transmittance, and has excellent durability.

In the case of when a substrate of the laminate according to the present invention is glass, the laminate according to the present invention may be used as a window of a vehicle or a building, and in this case, a safety window having energy reduction effect may be provided.

DESCRIPTION OF REFERENCE NUMERALS

Figure 1:
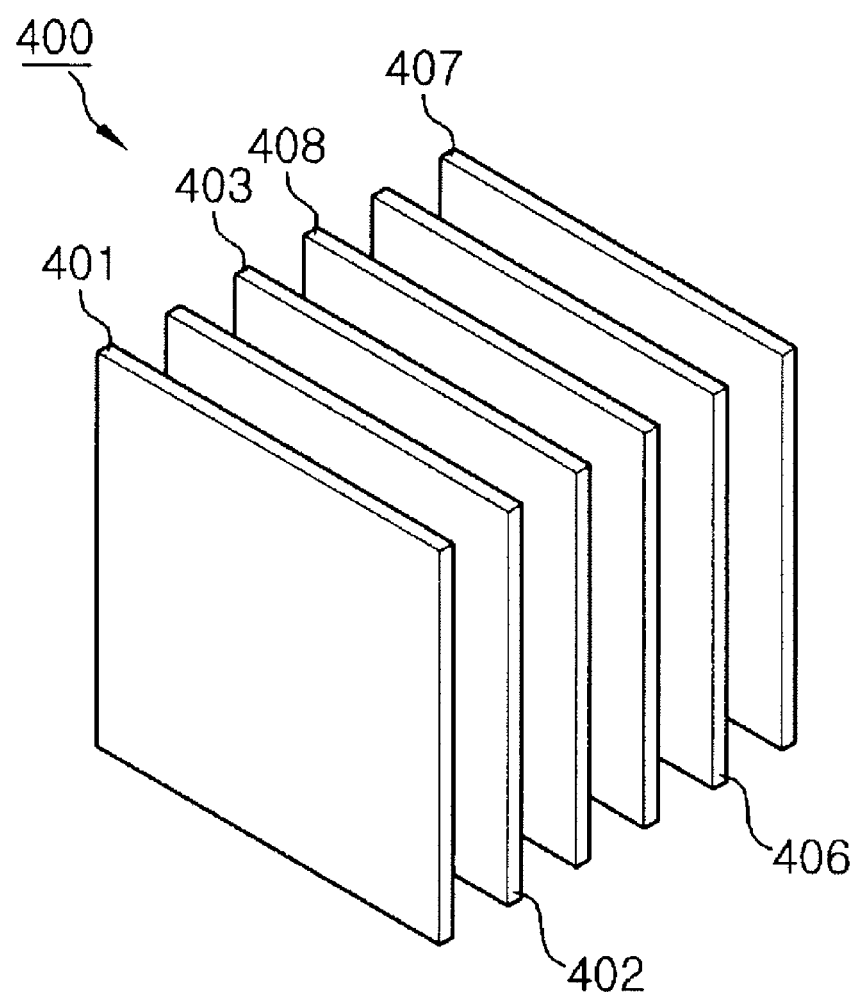
FIG. 1 is a view that illustrates an embodiment of a laminate according to the present invention.

400: Laminate
401: First glass
402: First adhesion film
403: Photochromic film
404: Second adhesion film
405: infrared (IR) shielding film
406: Third adhesion film
407: Second glass
408: infrared (IR) shielding coating layer

BEST MODE

The present invention provides a laminate that includes a pair of substrates; and one or more photochromic films and one or more infrared (IR) shield films that are provided between the pair of substrates, wherein the photochromic films or the infrared (IR) shield films that are in contact with a pair of substrates are adhered to the substrates by an adhesion film.

The substrate may be a glass or polymer film.

In the case of when the substrate is glass, the laminate according to the present invention may be used as a laminate having a multilayered structure in various fields. For example, the laminate according to the present invention may be used as a window of a vehicle or a window of a building.

It is preferable that the thickness of each glass is in the range of 1.8 to 2.5 mm. In the case of when the thickness is less than 1.8 mm, since it is very thin, it may be damaged in an adhesion process, and in the case of when the thickness is more than 2.5 mm, it may not be suitable to the standard of the vehicle door window.

The polymer film may be a transparent plastic film that is formed of one or more materials selected from the group consisting of polyethyleneterephthalate (PET), polyarylates, polyethersulfone (PES), polycarbonates (PC), polyethylenenaphthalates (PEN), polyimide (PI) and an epoxy resin.

In the case of when the substrate is the polymer film, the laminate according to the present invention may be used as a suntan film for vehicles and buildings, a sign post for advertisement or an ornament.

The thickness of the photochromic film may be in the range of 20 to 1000 μm. The thickness of the photochromic film in the above range is advantageous for providing a desired photochromic performance and maintaining processability of the photochromic film.

The photochromic film may be manufactured by using a coating method, a casting method, and an extrusion method. The manufacturing method of the photochromic film is not limited thereto, and may be controlled according to the condition of applying the photochromic film, and various methods known to those who are skilled in the art may be used.

One or two or more photochromic films may be layered. Preferably, the photochromic film may be used in the maximum number of five.

The photochromic film may be formed of the composition for manufacturing the photochromic film that includes a binder resin and a photochromic dye.

The binder resin may include one or more that are selected from the group consisting of the polymer resin having transparency or resins obtained by polymerizing various kinds of monomer single molecules. However, the kind thereof is not particularly limited, and the kind generally used in the art to which the present invention belongs may be used without a limit.

As the polymer resin, there are polyester, polyacrylate, polycarbonate, polyethylene, etc. The monomer means all kinds of single molecules including an acrylate group. For example, the resin that is obtained by polymerizing the acrylate monomer may be used as the binder resin.

The binder resin may include one or more that are selected from the group consisting of polyvinylbutyral resin, ethylenevinyl acetate resin, polyethylene resin, polyurethane resin, and polyacrylate resin, and in this case of when this is used, weatherability may be improved.

Herein, the polyvinylbutyral resin may have a weight average molecular weight in the range of 40,000 to 120,000. In the case of when the polyvinylbutyral resin is used, a glycol-based plasticizer may be used as a plasticizer.

The photochromic dye may include one or more that are selected from the group consisting of spirooxazine, benzopyran, napthopyran, chromeme and azo compound.

The composition for manufacturing the photochromic film includes 0.01 to 2 parts by weight of a photochromic dye on the basis of 100 parts by weight of the binder resin.

The composition for manufacturing the photochromic film further includes one or more that are selected from the group consisting of 0.01 to 5 parts by weight of polymerization initiator, 0.01 to 5 parts by weight of stabilizer (a thermal stabilizer or a photostabilizer), 0.01 to 5 parts by weight of UV absorbing agent, 0.01 to 5 parts by weight of antioxidant, 0.01 to 5 parts by weight of chain transfer agent, 0.01 to 5 parts by weight of infrared (IR) absorbing agent, 0.01 to 5 parts by weight of defoaming agent, 0.01 to 5 parts by weight of antistatic agent, 0.01 to 5 parts by weight of release agent, 0.01 to 1 parts by weight of leveling agent, and 0.0001 to 0.5 parts by weight of general dye on the basis of 100 parts by weight of the binder resin.

Herein, the thermal stabilizer may be included in the amount in the range of 0.1 to 3 parts by weight on the basis of 100 parts by weight of the binder resin, and the photostabilizer may be included in the amount in the range of 0.01 to 1 parts by weight on the basis of 100 parts by weight of the binder resin.

The general dye serves to compensate an initial color that is difficult to realize by using only the photochromic dye, and conceal discoloration or stains that may be generated when the photochromic dye is decomposed, and its kind is not particularly limited.

It is preferable that the general dye is included in the amount of 0.0001 to 0.5 parts by weight on the basis of 100 parts by weight of the binder resin. In the case of when the content thereof is less than 0.0001 parts by weight, an expected effect is difficult to be obtained according to the addition of the general dye. In the case of when the content is more than 0.5 parts by weight, the color that is darker than the expectation is realized, such that the effect of the photochromic dye is offset, the precipitation may occur because of a difference in compatibility to the solvent, and stains may be generated by the precipitation.

The composition for manufacturing the photochromic film may further include a crosslinking agent. The composition for manufacturing the photochromic film can include the binder resin, the photochromic dye, and the crosslinking agent. For example, it includes the acryl-based resin as the binder resin, and may further include 0.99 to 30 parts by weight of crosslinking agent and 0.01 to 5 parts by weight of photochromic dye on the basis of 100 parts by weight of the acryl-based resin.

Since the composition and the content of the composition for manufacturing the photochromic film may be controlled according to the condition of applying the photochromic film, the composition and the content are not limited thereto.

In the present invention, it is preferable that as the photochromic film, a freestanding film is used. The freestanding film means a film that is not changed in terms of shape at normal temperature and normal pressure at which there is no adhesion property.

In the case of when the photochromic film is a film having no adhesion property, an adhesion film is separately provided for attaching the photochromic film to the other film with which the photochromic film comes into contact, for example, to the infrared (IR) shielding film, as well as for attaching the photochromic film to the substrate. The adhesion film may affect performance of the photochromic film (the photochromic function is realized by receiving UV) according to the degree of inclusion of the UV shielding agent or the thickness.

Unlike the type of the freestanding film, a film in which the photochromic effect is directly applied to the adhesive coating layer by introducing the photochromic dye to the adhesive coating layer having the adhesion property may be used as the photochromic film. However, the type of the coating layer may have lower durability than the freestanding film.

The infrared (IR) shield film includes one or more infrared (IR) absorbing dyes that are selected from the group consisting of a metal complex-based dye, a phthalocyanine-based dye, a naphthalocyanine-based dye, a cyanine-based dye having a metal-complex form in a molecule, and a diimonium-based dye; or all kinds of metals that are capable of reflecting or absorbing IR. Preferably, it may include one or more metals that are selected from the group consisting of tin, antimony, and platinum (Pt).

According to the present invention, the infrared (IR) shielding film may include 10 to 60 wt % of binder resin, 30 to 80 wt % of solvent, 1 to 10 wt % of dispersing agent, and 0.01 to 1 wt % of infrared (IR) absorbing dye. For example, it may include 30 wt % of the binder resin, 65 wt % of solvent, 4.9 wt % of dispersing agent, and 0.1 wt % of infrared (IR) absorbing dye.

The thickness of the infrared (IR) shielding film may be in the range of 20 to 200 μm. This thickness range is advantageous in terms of the infrared (IR) shielding performance and processability, but is not limited to this range.

The infrared (IR) shielding film may be manufactured by coating metal on a transparent film such as polyethyleneterephthalate (PET), polycarbonates (PC), polyethylene (PE), or polymethylmethacrylate (PMMA) to manufacture a separate film or by coating it on the photochromic film.

In the present invention, in the case of when the freestanding film is used as the photochromic film, the coating layer that is directly coated on the photochromic film may be used as the infrared (IR) shielding film. In addition, while the freestanding film is used as the infrared (IR) shielding film, the adhesion film may be further provided between the photochromic film and the infrared (IR) shielding film.

One or two or more infrared (IR) shielding films may be layered. Preferably, the infrared (IR) shielding film may be used in the maximum number of three.

In the laminate according to the present invention, a pair of substrates, the photochromic film, or the infrared (IR) shielding film are adhered to the substrate by using the adhesion film.

The adhesion film serves to adhere the photochromic film or infrared (IR) shielding film that is the film in contact with the substrate to the substrate, and improve the durability and stability of the laminate. In detail, in the case of when the laminate is broken by a factor such as impact, since pieces separated from the laminate are not detached but adhered to the adhesion film, it is possible to improve stability, and the durability may be improved by lowering problems such as separation of each layer as time goes.

The adhesion film may include one or more resins that are selected from the group consisting of polyvinylbutyral resin, ethylenevinyl acetate resin, polyethylene resin, and polyurethane resin.

The laminate according to the present invention may be used as a laminate having a multilayered structure in various fields in the case of when the substrate is glass.

The laminate having the multilayered structure according to the present invention may be used as a window of a vehicle or a window of a building.

In the case of when the laminate according to the present invention is installed as, for example, the window of the vehicle or the window of the building, one of a pair of substrates is, for example, an outer substrate that is exposed to the outside of the vehicle or the outside of the building, and the other is an inner substrate that is disposed in the vehicle or the building. At this time, the laminate may have a structure in which an outer substrate, the adhesion film, the photochromic film, the infrared (IR) shielding film, the adhesion film, and an inner substrate are sequentially layered. In addition, the laminate may have a structure in which an outer substrate, the adhesion film, the photochromic film, the adhesion film, the infrared (IR) shielding film, the adhesion film, and an inner substrate are sequentially layered.

In the case of when the laminate according to the present invention includes two or more photochromic films or infrared (IR) shielding films, the photochromic films or infrared (IR) shielding films may be alternatively layered. For example, the laminate according to the present invention may have a structure in which an outer substrate, the adhesion film, the photochromic film, the adhesion film, the photochromic film, the adhesion film, the infrared (IR) shielding film, the adhesion film, and an inner substrate are sequentially layered. In addition, the laminate according to the present invention may have a structure in which an outer substrate, the adhesion film, the photochromic film, the adhesion film, the infrared (IR) shielding film, the adhesion film, the infrared (IR) shielding film, the adhesion film, and an inner substrate are sequentially layered.

Figure 3:
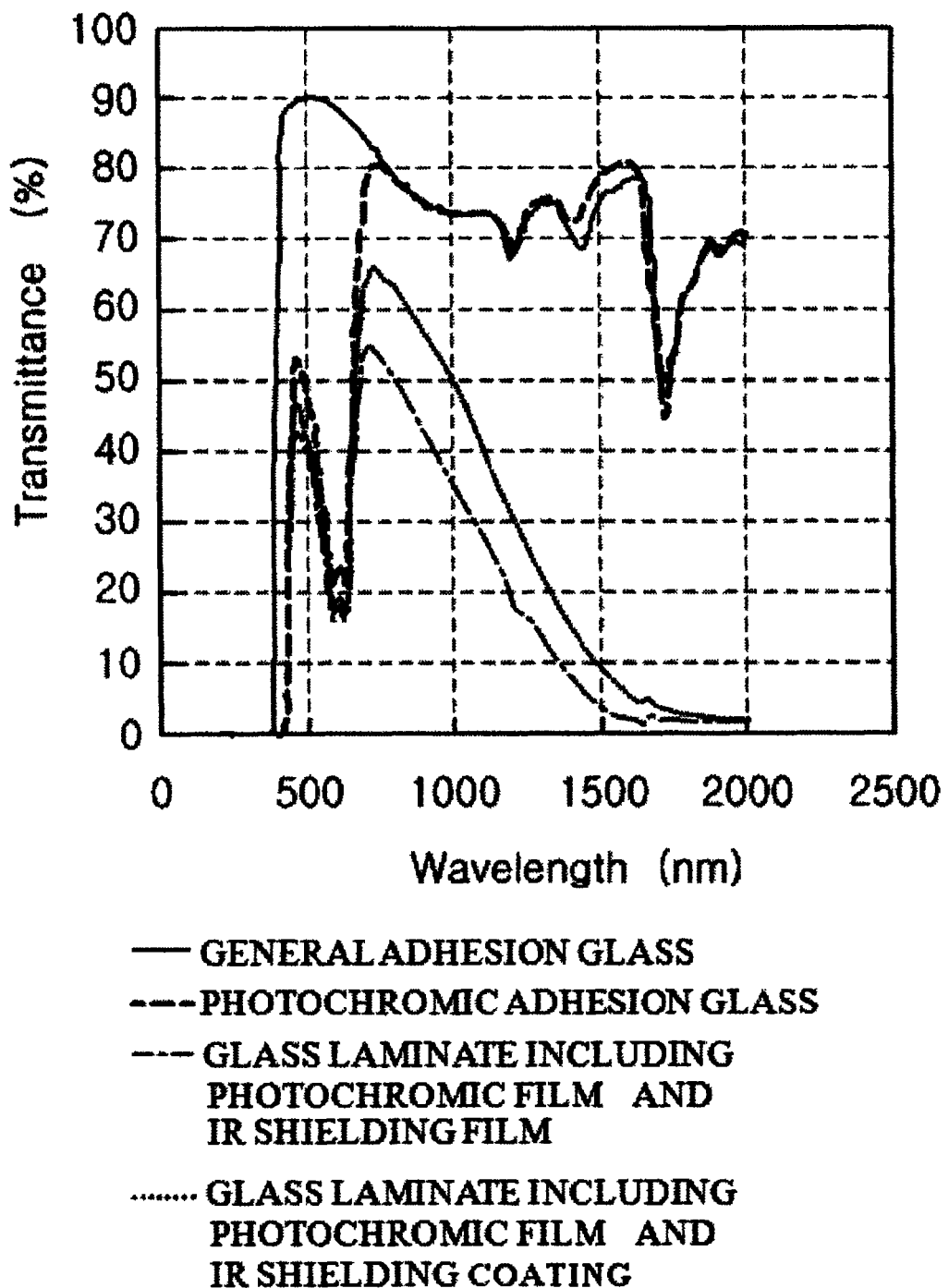
FIG. 3 is a graph that illustrates results of Examples (transmittance spectrum of the UV-VIS-NIR range (200 to 2000 nm) before discoloration)

The laminate according to the present invention may have a structure in which an outer substrate, the adhesion film, the infrared (IR) shielding film, the adhesion film, the photochromic film, the adhesion film, and an inner substrate are sequentially layered, but as shown in FIG. 3, in the case of when the photochromic film is disposed at the outer substrate (sample A), the photochromic transmittance may be efficiently lowered as compared to the case of when the infrared (IR) shielding film is disposed at the outer substrate.

Hereinafter, the present invention will be described in detail with reference to the accompanying drawings, which is set forth to illustrate but are not to be construed to limit the present invention.

The laminate according to an aspect of the present invention, as shown in FIG. 1, includes a first glass 401; a first adhesion film 402; a photochromic film 403; an infrared (IR) shielding coating layer 408; a second adhesion film 406; and a second glass 407.

Figure 2:
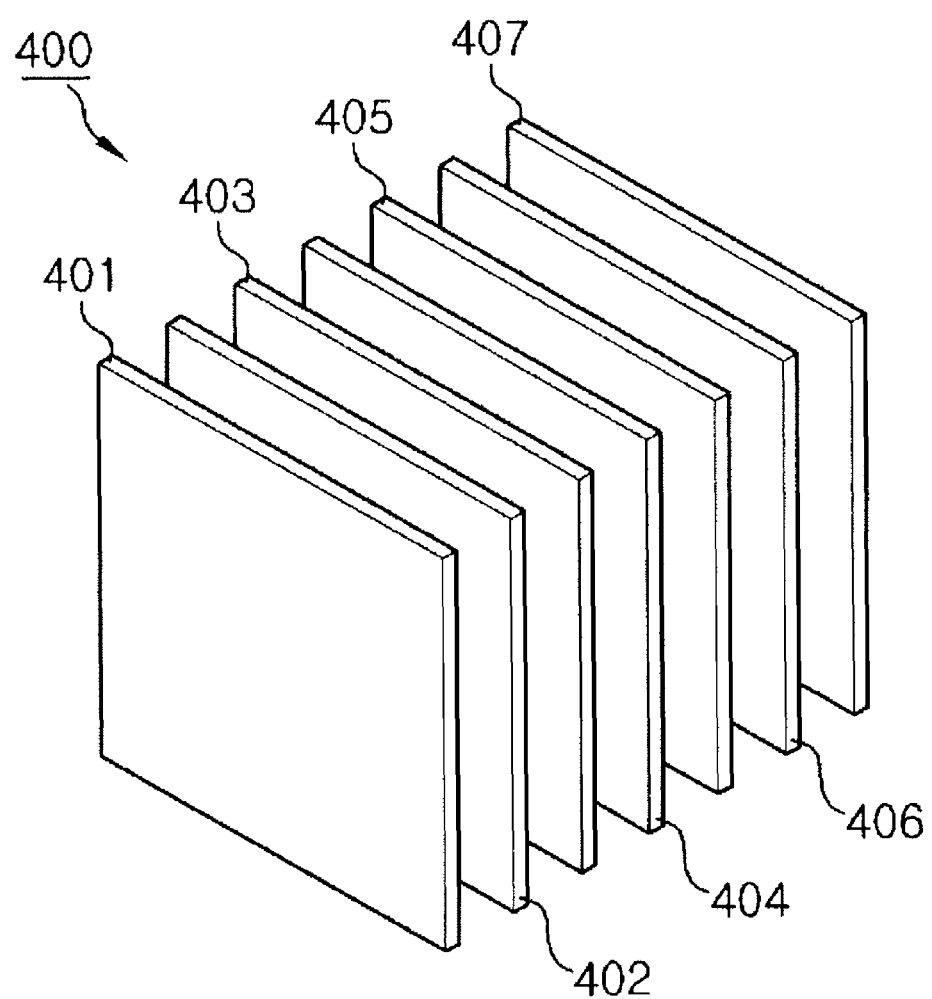
FIG. 2 is a view that illustrates an embodiment of a laminate according to the present invention.

The laminate according to another aspect of the present invention, as shown in FIG. 2, includes a first glass 401; a first adhesion film 402; a photochromic film 403; a second adhesion film 404, an infrared (IR) shielding film 405; a second adhesion film 406; and a second glass 407.

Herein, the substrate is glass, the adhesion film is used, one photochromic film and one infrared (IR) shielding film are used, but they are not limited thereto, and the substrate may be the polymer film, and several photochromic films and/or infrared (IR) shielding films may be provided.

The laminate according to the present invention may be used as a window for vehicles, a building material, a suntan film for buildings, a sign post for advertisement, an ornament and the like.

Hereinafter, the present invention will be described in more detail through Examples. However, the following Examples have been described in an illustrative manner, and it is to be understood that modifications will be apparent to those skilled in the art without departing from the spirit of the invention. Therefore, it is to be understood that within the scope of the appended claims, the invention may be practiced otherwise than as specifically described.

Example 1

<Manufacturing of the Composition for Manufacturing the Photochromic Film>

To the reactor, 100 parts by weight of polymethyl methacrylate as the binder resin, 1 part by weight of Palatinate purple (manufactured by James Robinson, Co., Ltd.) that was the photochromic dye on the basis of 100 parts by weight of the binder resin, 0.02 parts by weight of Papilion Blue (manufactured by Eastwell, Co., Ltd.) that was the general dye, 0.2 parts by weight of Tinuvin 1130 (manufactured by Ciba, Co., Ltd.) that was the UV absorbing agent, 1.0 parts by weight of Tinuvin 123 (manufactured by Ciba, Co., Ltd.) as the photostabilizer, and 0.8 parts by weight of HP1010 (manufactured by Ciba, Co., Ltd.) as the thermal stabilizer were added, and well mixed with each other for 30 min to manufacture the solid compound.

<Manufacturing of the Photochromic Film>

The extrusion film having the thickness of 500 μm in a freestanding film type was manufactured by using the solid mixture and the extrusion device.

<Manufacturing of the Infrared (IR) Shielding Film>

The infrared (IR) shielding film was manufactured by coating SR6070 manufactured by ANP, Co., Ltd. on the polyethyleneterephthalate (PET) film having the thickness of 100 μm.

<Manufacturing of the Laminate>

The laminate was manufactured by putting the manufactured photochromic film and infrared (IR) shielding film between the glass substrate and the glass substrate, putting the EVA film as the adhesion film, and pressing it under the condition of 140° C. and 10 MPa under the vacuum.

Example 2

The same method as Example 1 was carried out, except that the photochromic film was manufactured by using the composition for manufacturing the photochromic film manufactured by using the following method.

<Manufacturing of the Composition for Manufacturing the Photochromic Film>

To 60 parts by weight of BP4PA (on the basis of 100 parts by weight of the binder resin, the same basis applies correspondingly to the following) as the binder resin, 20 parts by weight of 9-EGDA, 10 parts by weight of styrene and 10 parts by weight of DVB (divinylbenzene) as the binder resin, 0.2 parts by weight of Palatinate purple (manufactured by James Robinson, Co., Ltd.) that was the photochromic dye, 1.0 part by weight of Tinuvin 144 (manufactured by Ciba, Co., Ltd.) as the photostabilizer, and 0.2 parts by weight of thermal initiator were added, agitated for about 2 hours to completely be dissolved, thereby obtaining the composition for manufacturing the photochromic film.

<Manufacturing of the Photochromic Film>

The composition for manufacturing the photochromic film was injected between the glass molds that were separated from each other by the spacer of 300 μm, and cured at 95° C. for 6 hours, and the mold was separated to manufacture the photochromic film in the freestanding film type.

Experimental Example 1

The sample having the layered structure of glass/EVA adhesion film/glass was manufactured (Comparative Example 1), the sample having the layered structure of glass/EVA adhesion film/photochromic film/EVA adhesion film/glass was manufactured by using the photochromic film according to Example 2 (Comparative Example 2), the sample having the layered structure of glass/EVA adhesion film/photochromic film/EVA adhesion film/IR shielding film/EVA adhesion film/glass was manufactured by using the photochromic film and the infrared (IR) shielding film according to Example 2 (Example 2), and the transmittance spectrum of the UV-VIS-NIR range (200 to 2000 nm) before discoloration was obtained by using the SolidSpec-3700 apparatus manufactured by SHIMADZU, Co., Ltd.

As shown in the graph of FIG. 3, in the case of the photochromic adhesion glass (Comparative Example 2) as compared to the simple adhesion glass (Comparative Example 1), the shielding effect at the UV and VIS region was increased, and in the case of when the photochromic and infrared (IR) shielding film were adhered together (Example 2), the shielding effect at the UV-VIS-NIR region was increased.

Experimental Example 1

The laminate sample (A) that had the structure of outer glass/EVA adhesion film/photochromic film/EVA adhesion film/IR shielding film/EVA adhesion film/inner glass and the laminate sample (B) that had the structure of outer glass/EVA adhesion film/IR shielding film/EVA adhesion film/photochromic film/EVA adhesion film/inner glass were manufactured by using the photochromic film and infrared (IR) shielding film of Experimental Example 1.

Herein, when the laminate was installed in, for example, a vehicle, the glass that is exposed to the outer environment of the vehicle is the outer glass, and the glass that is disposed in the vehicle is the inner glass.

Like this, the laminate sample (A) in which the photochromic film was adhered to the outer glass and the infrared (IR) shielding film was adhered to the inner glass layer and the laminate sample (B) in which the infrared (IR) shielding film was adhered to the outer glass layer and the photochromic film was adhered to the inner glass were compared to each other by using the following method.

On the basis of 100% of the transmittance of the initial laminate, after UV having the wavelength of 365 nm (1.35 mW/cm$^2$) was irradiated to the outer glass for 4 min, the transmittances of the visible ray region in colored states were measured by using the UV-Vis detector.

Figure 4:
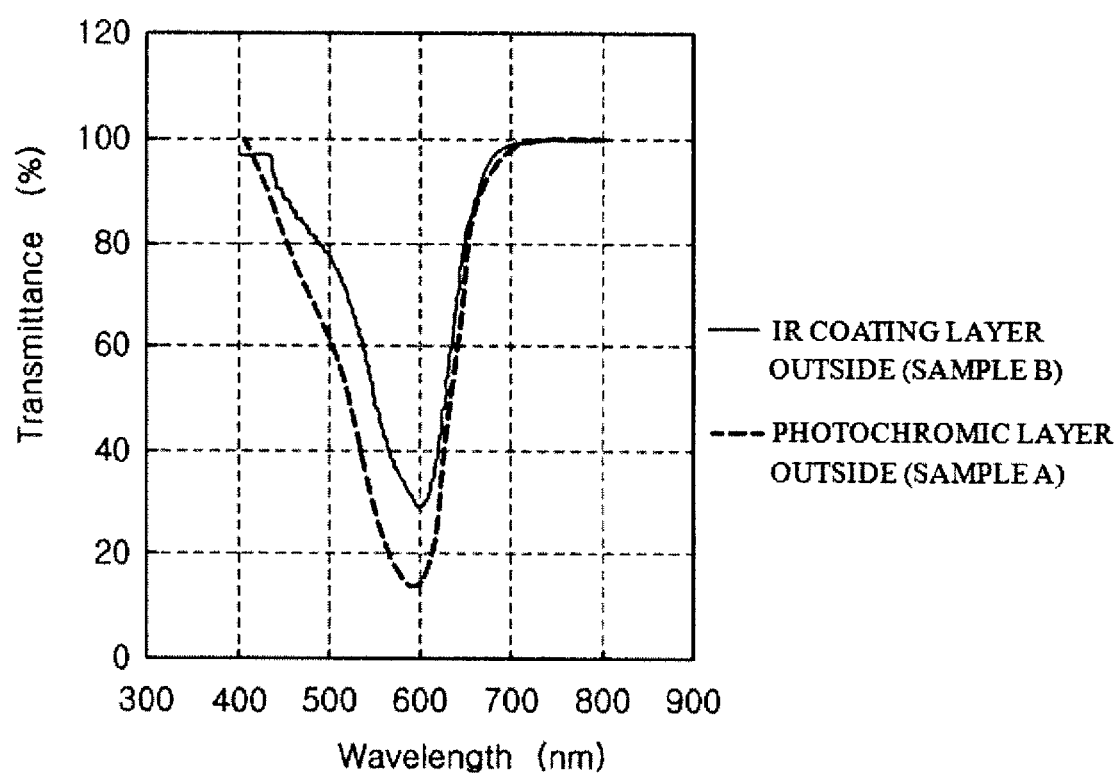
FIG. 4 is a graph that illustrates results of Experimental Example 2 (measurement of transmittance of the visible ray range in a colored state)

Through FIG. 4, the case of when the photochromic film is disposed at the outer glass, the photochromic transmittance is more efficiently lowered as compared to the case of when the infrared (IR) shielding film is disposed at the outer glass.

Example 3

Use of Ethylene Vinyl Acetate Resin

To the reactor, 79 wt % of toluene, 0.1 wt % of Palatinate purple (manufactured by James Robinson, Co., Ltd.) that was the photochromic dye, 0.01 wt % of Papilion Blue (manufactured by Eastwell, Co., Ltd.) that was the general dye, 0.06 wt % of Tinuvin 1130 (manufactured by Ciba, Co., Ltd.) as the UV absorbing agent, 0.27 wt % of Tinuvin 123 (manufactured by Ciba, Co., Ltd.) as the photostabilizer, 0.23 wt % of HP1010 (manufactured by Coba, Co., Ltd.) as the thermal stabilizer, and 0.03 wt % of Tego 270 (manufactured by Degussa, Co., Ltd.) as the leveling improving agent were added, agitated at the temperature of 60° C. for 30 min to be completely dissolved, and 20.3 wt % of ethylene vinyl acetate resin (the content of vinyl acetate was 40%, manufactured by Exxonmobile, Co., Ltd.) was added as the binder resin and agitated at the same temperature for about 2 hours to be completely dissolved.

The solution was filtered to obtain the photochromic resin composition. The photochromic glass was manufactured by coating the manufactured photochromic resin composition on the glass plate in a thickness of 700 μm, covering another glass plate thereon, and pressing it under the condition of 140° C. and 10 MPa under the vacuum.

Example 4

Use of Polyvinylbutyral Resin

To the reactor, 9 wt % of S-2075 (manufactured by Solutai, Co., Ltd.) that was the glycol-based plasticizer, 34 wt % of butylcellosolve, 34 wt % of toluene, 0.11 wt % of Palatinate purple (manufactured by James Robinson, Co., Ltd.) that was the photochromic dye, 0.01 wt % of Papilion Blue (manufactured by Eastwell, Co., Ltd.) that was the general dye, 0.06 wt % of Tinuvin 1130 (manufactured by Ciba, Co., Ltd.) as the UV absorbing agent, 0.32 wt % of Tinuvin 123 (manufactured by Ciba, Co., Ltd.) as the photostabilizer, 0.27 wt % of HP1010 (manufactured by Ciba, Co., Ltd.) as the thermal stabilizer, and 0.03 wt % of Tego 270 (manufactured by Degussa, Co., Ltd.) as the leveling improving agent were added, agitated at the temperature of 60° C. for 30 min to be completely dissolved, and 22.2 wt % of polyvinylbutyral resin was added as the binder resin and agitated at the same temperature for about 2 hours to be completely dissolved. The solution was filtered to obtain the photochromic resin composition. The photochromic glass was manufactured by coating the manufactured photochromic resin composition on the glass plate in a thickness of 700 μm, covering another glass plate thereon, and pressing it under the condition of 140° C. and 10 MPa under the vacuum.

Example 5

Use of Acrylate Resin

The same method as Example 4 was carried out, except that the acrylate resin was used instead of the polyvinylbutyral resin as the binder resin.

Experimental Example 3

The weatherability of the photochromic glass according to Examples 3 to 5 was measured by irradiating the light in the intensity of 0.77 W/m$^2$/nm using the UVA 340 lamp of ATLAS UV 2000 that was the promotion weatherability tester on the basis of ASTM G154-99.

The exposing cycle will be described below.

8 hours and 60 (±3)° C. black panel temperature 4 hours and condensation 50 (±3)° C. black panel temperature The samples were drawn in the middle of the process of repeating the above procedure, and the transmittances were measured in discoloration. On the basis of 100% of the transmittance of the film, after UV having the wavelength of 365 nm (1.35 mW/cm$^2$) was irradiated to the laminate for 4 min, the transmittances of the visible ray region in colored states were measured by using the UV-Vis detector.

Figure 5:
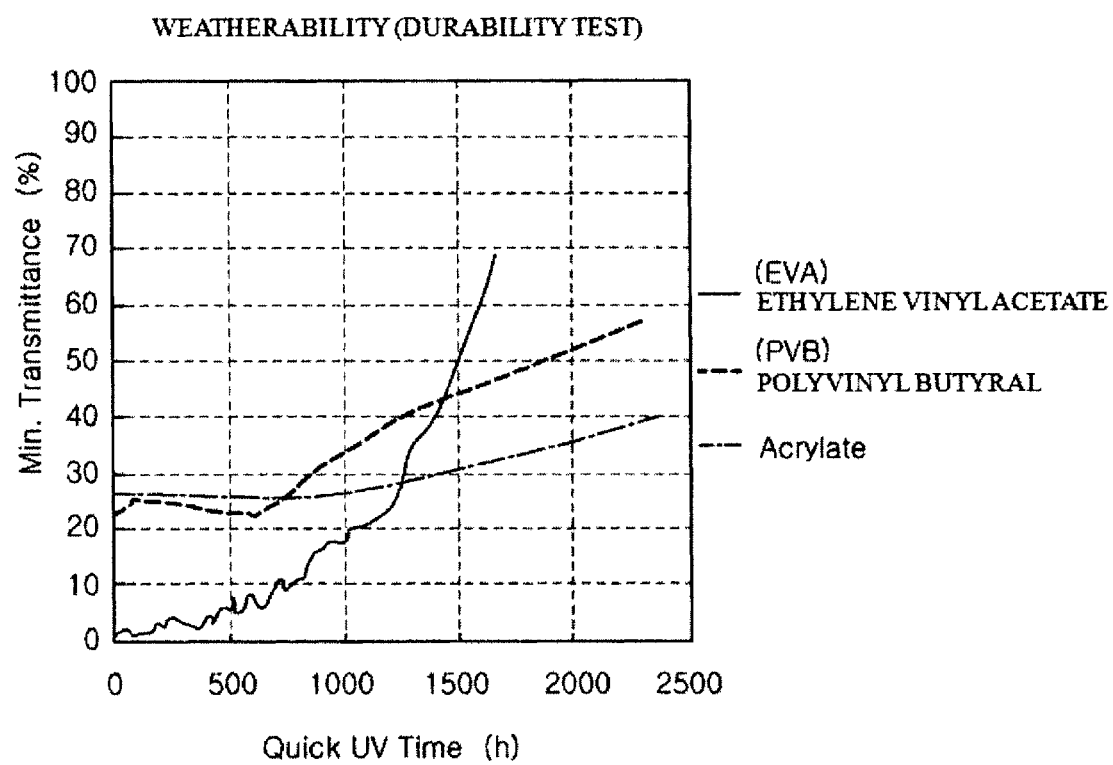
FIGS. 5 and 6 are graphs that illustrate results of Experimental Examples 3 and 4 (weatherability test).

As shown in FIG. 5 that illustrates the results of Experimental Example 3, if the glass laminate according to the present invention includes the photochromic film that was manufactured by using the polyvinyl butyral resin, the ethylenevinyl acetate resin, or the acrylate resin as the binder resin, it is possible to provide excellent weatherability. In particular, in the case of when the acrylate resin is used, the weatherability is much better.

Experimental Example 3

Figure 6:
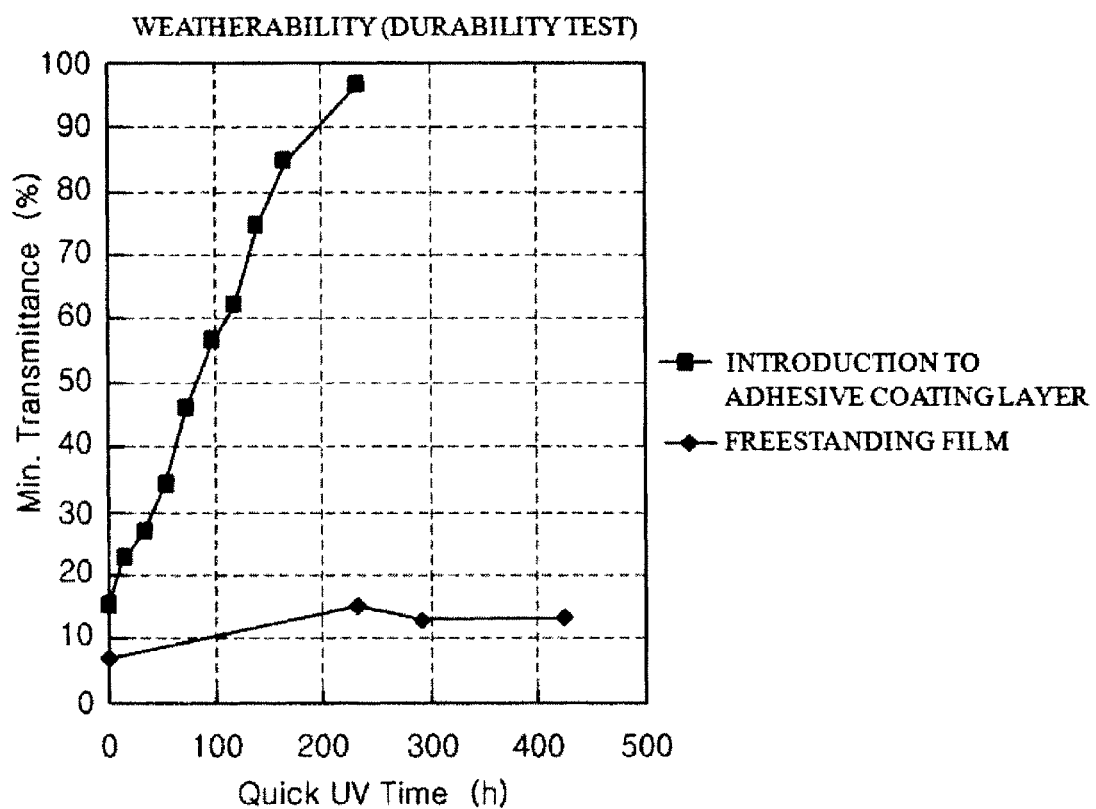

The photochromic film that was manufactured in Example 2 was manufactured as the free standing film in which the photochromic dye was not introduced into the adhesive layer. The weatherability promotion test of the photochromic film manufactured in Example 2 and the photochromic film in which the photochromic dye was introduced into the adhesive coating layer was performed, and the results are shown in FIG. 6. The weatherability promotion test was performed by using the same method as Experimental Example 3.

<Manufacturing of the Photochromic Film in which the Photochromic Dye was Introduced into the Adhesive Coating Layer>

To the reactor, 97 wt % of coating solution (LG Chemicals, Co., Ltd., trademark: AT21PC: polyurethane monomer coating solution including polyol, diol, and diisocyanate) was added, 2 wt % of Palatinate purple (manufactured by James Robinson, Co., Ltd.) that was the photochromic dye was added thereto, and 1 wt % of TINUVIN-144 (TINUVIN™, manufactured by Chiba Geigi, Co.) was added thereto, and they were agitated at normal temperature for 3 hours to manufacture the coating composition. The manufactured coating composition was bar coated on the polycarbonates (PC) film having the thickness of 300 μm, cured at 130° C. for 1 hour to manufacture the photochromic polyurethane coating film. On the coating film, the other polycarbonate (PC) film having the thickness of 300 μm was laminated at 140° C. to manufacture the photochromic film.

Through FIG. 6, it can be confirmed that in the case of when the photochromic film is formed of the freestanding film, it has better weatherability as compared to the photochromic film that was manufactured by introducing the photochromic dye into the adhesive coating layer.

Example 6

The photochromic film was manufactured by using the same method as Example 2. SR6070 that was manufactured by ANP, Co., Ltd. used in Example 1 was coated on the photochromic film, dried at 100° C. for 30 min to manufacture the photochromic film on which the infrared (IR) shielding film was coated.

The glass laminate was manufactured by putting the manufactured photochromic film on which the infrared (IR) shielding film was coated between the glass substrate and the glass substrate, putting the EVA film that was the adhesion film, and pressing it under the condition of 140° C. and 10 MPa under the vacuum.

From FIG. 3, it can be seen that the infrared (IR) shielding effect is slightly lower as compared to the case of when the infrared (IR) shielding film was directly put, but it is possible to the photochromic effect and the infrared (IR) shielding effect can be ensured over all.

The invention claimed is:

1. A laminate comprising:
   a pair of substrates; and
   one or more photochromic films and one or more infrared (IR) shield films that are provided between the pair of substrates,
   wherein the photochromic film that is in contact with one of the substrates is adhered to the substrate by an adhesion film;
   wherein the infrared (IR) shield film that is in contact with another of the substrates is adhered to the substrate by an adhesion film;
   wherein the photochromic film is a freestanding film; and
   wherein the infrared (IR) shield film is a coating layer that is directly coated on the photochromic film.

2. The laminate as set forth in claim 1, wherein the laminate has a structure in which a first substrate, an adhesion film, the photochromic film, the infrared (IR) shielding coating layer, an adhesion film, and a second substrate are sequentially layered.

3. The laminate as set forth in claim 1, wherein the substrates are glass or polymer films.

4. The laminate as set forth in claim 1, wherein the photochromic film includes a composition for manufacturing a photochromic film, which includes a binder resin and a photochromic dye.

5. The laminate as set forth in claim 4, wherein the composition for manufacturing a photochromic film further includes a crosslinking agent.

6. The laminate as set forth in claim 4, wherein the binder resin includes one or more that are selected from the group consisting of polyvinylbutyral resin, ethylenevinyl acetate resin, polyethylene resin, polyurethane resin, and polyacrylate resin.

7. The laminate as set forth in claim 4, wherein the photochromic dye includes one or more that are selected from the group consisting of spirooxazine, benzopyran, napthopyran, chromeme and azo compound.

8. The laminate as set forth in claim 4, wherein the composition for manufacturing the photochromic film includes 0.01 to 2 parts by weight of a photochromic dye on the basis of 100 parts by weight of the binder resin.

9. The laminate as set forth in claim 4, wherein the composition for manufacturing the photochromic film further includes one or more that are selected from the group consisting of 0.01 to 5 parts by weight of polymerization initiator, 0.01 to 5 parts by weight of stabilizer, 0.01 to 5 parts by weight of ultraviolet (UV) absorbing agent, 0.01 to 5 parts by weight of antioxidant, 0.01 to 5 parts by weight of chain transfer agent, 0.01 to 5 parts by weight of infrared (IR) absorbing agent, 0.01 to 5 parts by weight of defoaming agent, 0.01 to 5 parts by weight of antistatic agent, 0.01 to 5 parts by weight of release agent, 0.01 to 1 parts by weight of leveling agent, and 0.0001 to 0.5 parts by weight of general dye on the basis of 100 parts by weight of the binder resin.

10. The laminate as set forth in claim 1, wherein the infrared (IR) shield film includes one or more infrared (IR) absorbing dyes selected from the group consisting of a metal complex-based dye, a phthalocyanine-based dye, a naphthalocyanine-based dye, a cyanine-based dye having a metal-complex form in a molecule, and a diimonium-based dye; or one or more metals selected from the group consisting of tin, antimony and platinum (Pt).

11. The laminate as set forth in claim 1, wherein the adhesion films include one or more resins selected from the group consisting of polyvinylbutyral resin, ethylenevinyl acetate resin, polyethylene resin, and polyurethane resin.

12. The laminate as set forth in claim 1, wherein one of a pair of substrates is an outer substrate that is exposed to the outside of an installation environment in which the laminate is installed, and the other is an inner substrate that is disposed therein, and the laminate has a structure in which the outer substrate, an adhesion film, the photochromic film, the infrared (IR) shielding film, an adhesion film, and the inner substrate are sequentially layered.

13. The laminate as set forth in claim 1, wherein the laminate includes two or more photochromic films or infrared (IR) shielding films, and has a structure in which the photochromic films and infrared (IR) shielding films are alternatively layered.

* * * * *